(12) United States Patent
Yamamoto

(10) Patent No.: US 7,971,436 B2
(45) Date of Patent: Jul. 5, 2011

(54) ROTARY STEAM ENGINE

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 569 days.

(21) Appl. No.: 11/989,759

(22) PCT Filed: Jul. 27, 2006

(86) PCT No.: PCT/JP2006/315343
§ 371 (c)(1),
(2), (4) Date: Jan. 31, 2008

(87) PCT Pub. No.: WO2007/018103
PCT Pub. Date: Feb. 15, 2007

(65) Prior Publication Data
US 2010/0095667 A1    Apr. 22, 2010

(30) Foreign Application Priority Data

Aug. 8, 2005  (JP) .................................. 2005-229152

(51) Int. Cl.
*F03B 17/02* (2006.01)
*F01K 25/02* (2006.01)
*F01K 23/06* (2006.01)
*F02C 1/04* (2006.01)

(52) U.S. Cl. ................ 60/496; 60/650; 60/670; 290/1 R

(58) Field of Classification Search .................. 60/669, 60/670, 516–526, 657, 495–507; 310/49.32, 310/152–156.84, 86, 159–176, 268
See application file for complete search history.

(56) References Cited

U.S. PATENT DOCUMENTS

| 6,995 A   * | 1/1850  | Black .............................. 60/496 |
| 29,303 A  * | 7/1860  | Pringle .......................... 60/496 |
| 144,883 A * | 11/1873 | Beekman ....................... 60/496 |

(Continued)

FOREIGN PATENT DOCUMENTS

JP    54-129245    10/1979

(Continued)

*Primary Examiner* — Thomas E Denion
*Assistant Examiner* — Christopher Jetton
(74) *Attorney, Agent, or Firm* — McGinn IP Law Group, PLLC

(57) ABSTRACT

A rotary steam engine of a simple constitution capable of efficiently obtaining mechanical energy not only from a heat source of a high temperature but also from various heat sources in a low-temperature state such as the exhaust heat of an internal combustion engine. The engine has a rotor 1 having a plurality of displacement chambers 11 provided in a sealed container 2 which is filled with a liquid. A steam-generating portion 4 is arranged under the rotor 1 and where the liquid vaporizes being heated by the exhaust heat of an internal combustion engine. The vaporized stem is jetted from a flow-out passage 42 toward the displacement chambers 11 of the rotor 1. The steam stays in the displacement chambers 11 and, therefore, buoyancy acts onto the displacement chambers 11 on one side of the rotor 1. The rotor 1 rotates to produce the rotational energy. The steam in the displacement chambers 11 is released in the sealed container 2 accompanying the rotation of the rotor 1, and is introduced into a condenser 3 where the steam is condensed and refluxes into the sealed container 2. The pressure in the sealed container 2 is maintained to be a saturated steam pressure by a vacuum pump 34. Therefore, the steam is formed despite the liquid has a low temperature to rotate the rotor 1.

8 Claims, 3 Drawing Sheets

U.S. PATENT DOCUMENTS

| | | | | |
|---|---|---|---|---|
| 169,269 A | * | 10/1875 | Johnson | 60/496 |
| 190,923 A | * | 5/1877 | Sparrow | 60/496 |
| 196,038 A | * | 10/1877 | Partz | 60/496 |
| 211,143 A | * | 1/1879 | Fogarty | 60/496 |
| 3,715,885 A | * | 2/1973 | Schur | 60/496 |
| 4,095,426 A | * | 6/1978 | Rhodes | 60/496 |
| 4,196,590 A | * | 4/1980 | Fries | 60/496 |
| 5,214,333 A | * | 5/1993 | Kawamura | 310/153 |
| 5,388,960 A | * | 2/1995 | Suzuki et al. | 415/176 |
| 5,488,828 A | * | 2/1996 | Brossard | 60/675 |

FOREIGN PATENT DOCUMENTS

| | | | |
|---|---|---|---|
| JP | 59-34407 | | 2/1984 |
| JP | 6-137259 | | 5/1994 |
| JP | 2001-20706 | | 1/2001 |
| JP | 2001020706 A | * | 1/2001 |

* cited by examiner

ROTARY STEAM ENGINE

FIELD OF THE INVENTION

This invention relates to a steam engine for converting thermal energy into mechanical energy such as rotational energy and, more particularly, to a steam engine of a simple constitution for efficiently generating the mechanical energy from a heat source of relatively low temperature.

BACKGROUND ART

In recent years, technologies have been developed for utilizing a variety of energy resources from a viewpoint of the environmental measure, saving resources and saving energy. Among them is a technology for taking out the mechanical energy from the thermal energy present in the natural world, such as solar heat. Technologies have also been developed to improve thermal efficiency of an internal combustion engine by recovering the power which is generated by utilizing the exhaust heat wasted into the exhaust gas or into the cooling water of an internal combustion engine such as diesel engine and the like.

Heat engines are used for converting the thermal energy into the mechanical energy such as rotational energy. Heat engines such as the internal combustion engine and the steam turbines that use an ordinary fuel such as petroleum, natural gas or the like, are the ones in which the fuel is burned to produce an operation fluid of a high temperature and a high pressure and the thermal energy is converted into the mechanical energy, and feature a high thermal efficiency since the mechanical energy is taken out from the heat source in the state of a high temperature. However, the temperature of the thermal energy in the natural world and the exhaust heat of the internal combustion engine are, usually, not so high, i.e., these are the thermal energy in a low-temperature state. In order to efficiently take out the mechanical energy from such heat sources, therefore, it becomes necessary to use a heat engine adapted to the heat source in a low-temperature state.

The engine disclosed in JP-A-2001-20706 is a heat engine for generating the mechanical energy from the heat source in a low-temperature state. As shown in FIG. 3, this engine comprises a steam-generating portion 101 and a cooling portion 102 which are coupled together through nozzles 103. A turbine 106 is arranged in the cooling portion 102 at a position facing the nozzles 103, and rotates together with magnets 107. On the inside of the magnets 107, a stationary generating coil 110 is arranged facing thereto, and the magnets 107 and the generating coil 110 together constitute a generating device. The steam-generating portion 101 and the cooling portion 102 are sealed, respectively. Water 104 which is an operation fluid is filled therein, and the air inside is evacuated by a vacuum pump. Many heat pipes 105 for heat radiation are mounted on the upper side of the cooling portion 102.

The steam-generating portion 101 and the cooling portion 102 as a whole constitute a heat pipe, and water 104, which is heated in the steam-generating portion 101 from the lower side thereof and becomes steam, creates a high-speed stream which is jetted to the blades of the turbine 106 from the nozzles 103. Accordingly, the turbine 106 and the magnets 107 rotate to produce the rotational energy which is, finally, converted into the electric energy by the magnets 107 and the generating coil 110, and is output to an external unit. The steam after having driven the turbine 106 is cooled down with the heat-radiating action of the heat pipes 105 and returns back to water. The condensate falls down to the lower side of the cooling portion 102 due to gravity, and is refluxed into the steam-generating portion 101 through the central portion.

The heat pipe that utilizes vaporization and condensation of liquid contained in the sealed container is, usually, used as a heat conveying means, i.e., as a heat transfer device. Here, the steam of liquid contained in the heat pipe moves accompanying large velocity energy and, therefore, the power can be taken out therefrom as described above. In this case, the mechanical energy can be taken out from the heat source in a low-temperature state.

The turbine disclosed in the above JP-A-2001-20706 is a so-called velocity type engine which utilizes the velocity energy of the operation fluid. To efficiently operate the turbine, the rotational speed of the turbine must be increased so that the circumferential velocity thereof is increased to match the velocity of the steam. However, when decreasing the diameter of the turbine to miniaturize it, the rotational speed of the turbine becomes very high and a large centrifugal force acts on the turbine and may beak it down. To drive the load by using an engine which revolves at high speeds, further, it becomes necessary to provide a reduction gear to lower the rotational speed. When it is attempted to take out the power in the form of electric energy by a generator, a peripheral control unit being necessary for the high speed generator are complex and expensive. Further, when the temperature of the heating portion is low and the steam is of a low temperature, the superheat of the steam is in low degree, and water droplets tend to form due to the cooling. Water droplets that are formed come into collision with the turbine blades at high speeds, and the so-called erosion is developed on the turbine blades due to the collision of water droplets.

When the heat engine is rotated being contained in a closed container, the rotary shaft must be supported by bearings having sealing performance. To support the rotary shaft that rotates at high speeds such as of the turbine, precision bearings are necessary. Namely, complex and expensive bearings must be used to support the rotary shaft maintaining sealing performance, thus requiring an increased cost for the maintenance.

The assignment of the present invention is to provide a heat engine capable of obtaining the mechanical energy not only from the heat sources of high temperatures but also from various heat sources in a low-temperature state, such as exhaust heat by an internal combustion engine while solving the above-mentioned problems inherent in the conventional heat engines.

DISCLOSURE OF THE INVENTION

In order to solve the above-mentioned problems inherent in the conventional heat engines, the steam engine of the present invention has a rotor having a plurality of displacement chambers provided in a sealed container which is filled with a liquid, wherein the buoyancy acting on the displacement chambers is utilized to rotate the rotor to thereby efficiently take out the power even at low rotational speeds despite of a simple structure. That is, as described in claim 1, "the present invention is concerned with a steam engine comprising a sealed container containing a liquid therein, a steam-generating portion arranged under the sealed container being communicated with the sealed container to generate the steam of the liquid, and a condenser arranged over the sealed container being communicated with the sealed container to condense the steam of the liquid, wherein a rotor having a plurality of displacement chambers is provided in the sealed container;

the rotor being dipped in the liquid is rotatably supported within the sealed container; and the steam of the liquid generated by heating the steam-generating portion is fed to the displacement chambers;

so that buoyancy acts on one side of the rotor so as to rotate the rotor."

The steam engine of the present invention constituted as above-described has the rotor having a plurality of displacement chambers provided in the sealed container which contains the liquid, the rotor being dipped in the liquid, and wherein the steam generated in the steam-generating portion is fed into the displacement chamber on one side of the rotor. The steam fills the displacement chamber on one side expelling the liquid out of the displacement chamber. Here, since the steam has a specific gravity much smaller than the liquid, buoyancy due to a difference of density acts on one side of the rotor and, therefore, a rotational torque acts on the rotor. The displacement chambers are consecutively formed in a plural number on the rotor. Therefore, the rotor rotates continuously, and the power can be taken out. The magnitude of buoyancy acting on the rotor is irrelevant to the rotational speed of the rotor. Therefore, a constant torque is obtained even when the rotor rotates at low speed. Unlike the turbine that converts the velocity energy of steam into the rotational energy, the engine of the invention can be efficiently operated even at low speed. The steam in the displacement chambers of the rotor is discharged into the liquid in the sealed container accompanying the rotation of the rotor, and is sent into the condenser arranged over the sealed container where the steam is cooled and is condensed into the liquid, and is refluxed into the sealed container.

The rotor of the steam engine has a structure simply forming a plurality of displacement chambers on the outer circumference thereof, and requires neither moving members that undergo a relative movement nor sealing members. Namely, the structure is simple and features excellent durability and greatly decreased cost for the maintenance. Moreover, since the rotational speed is low, there is no need of employing precision bearings for high speeds for supporting the rotary shaft unlike the turbine. Besides, no erosion is caused by the collision with water droplets.

As described in claim 2, it is desired that partitioning walls are formed among the plurality of displacement chambers of the rotor, and the steam of the liquid is jetted in a direction in which the rotor rotates from the steam-generating portion and is fed into the displacement chambers. The steam thus fed collides with the partitioning walls maintaining velocity energy, and works to discharge the liquid in the displacement chambers rearward in the direction in which the rotor rotates. The rotor receives the colliding action accompanying the collision by the steam and, further, receives the reaction from the liquid being discharged. This assists the torque acting on the rotor in the direction in which it rotates, and the steam engine produces a further increased output in further improved efficiency.

As described in claim 3, further, it is desired that a vacuum pump is connected to the condenser, and the pressure in the sealed container and in the condenser is set to be a saturated steam pressure of the liquid. When the gas such as air and the like is evacuated from the condenser by using the vacuum pump, the boiling point of the liquid reduces, and the liquid becomes steam even at low temperature. As a result, the liquid easily turns into the steam even when the temperature of the heating portion is not so high, and the engine is efficiently operated to take out the rotational energy.

BEST MODE FOR CARRYING OUT THE INVENTION

Figure 1:
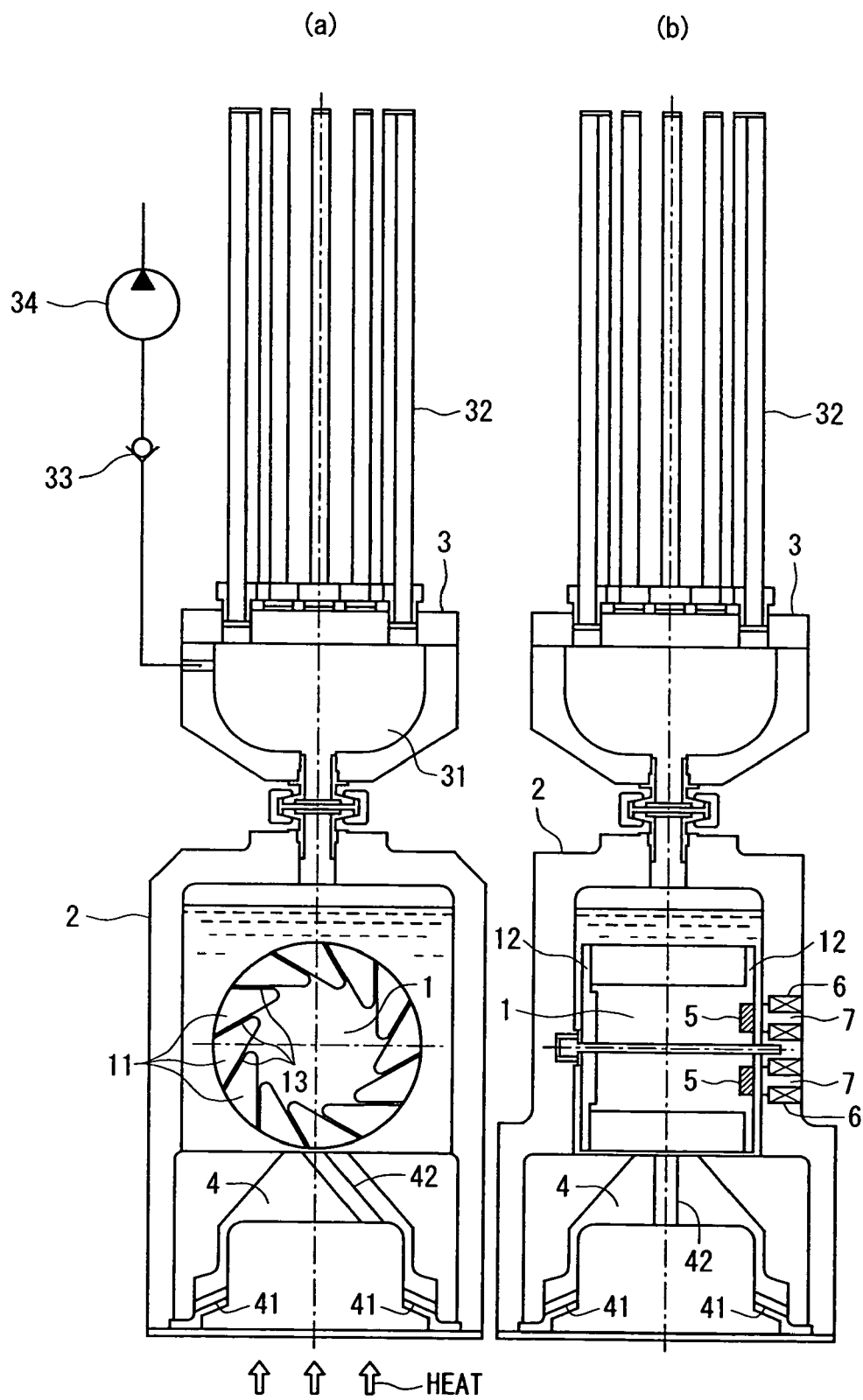
FIG. 1 is a sectional view of a steam engine of the present invention.
Figure 2:
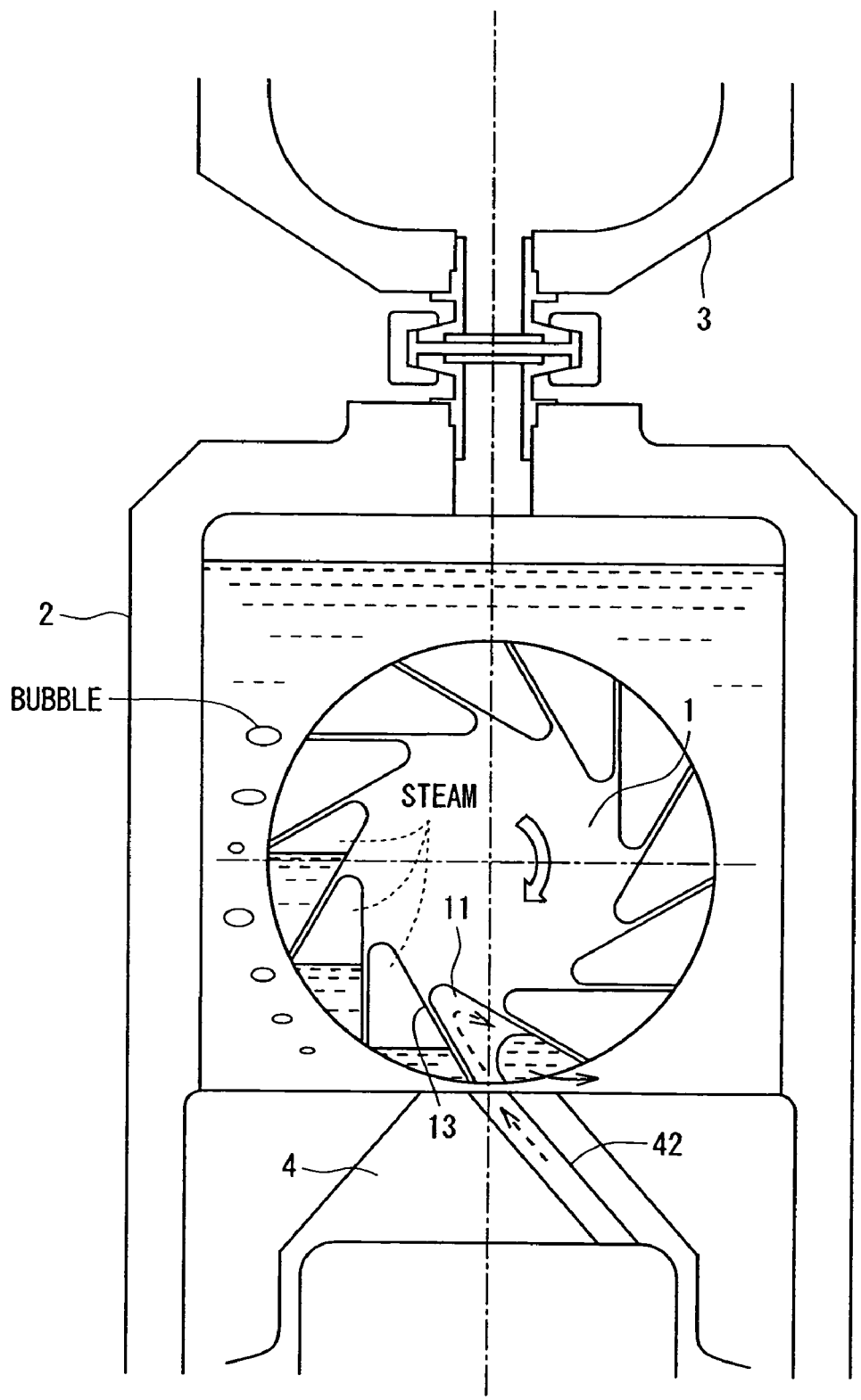
FIG. 2 is a view illustrating the operating state of the steam engine of the present invention.
Figure 3:
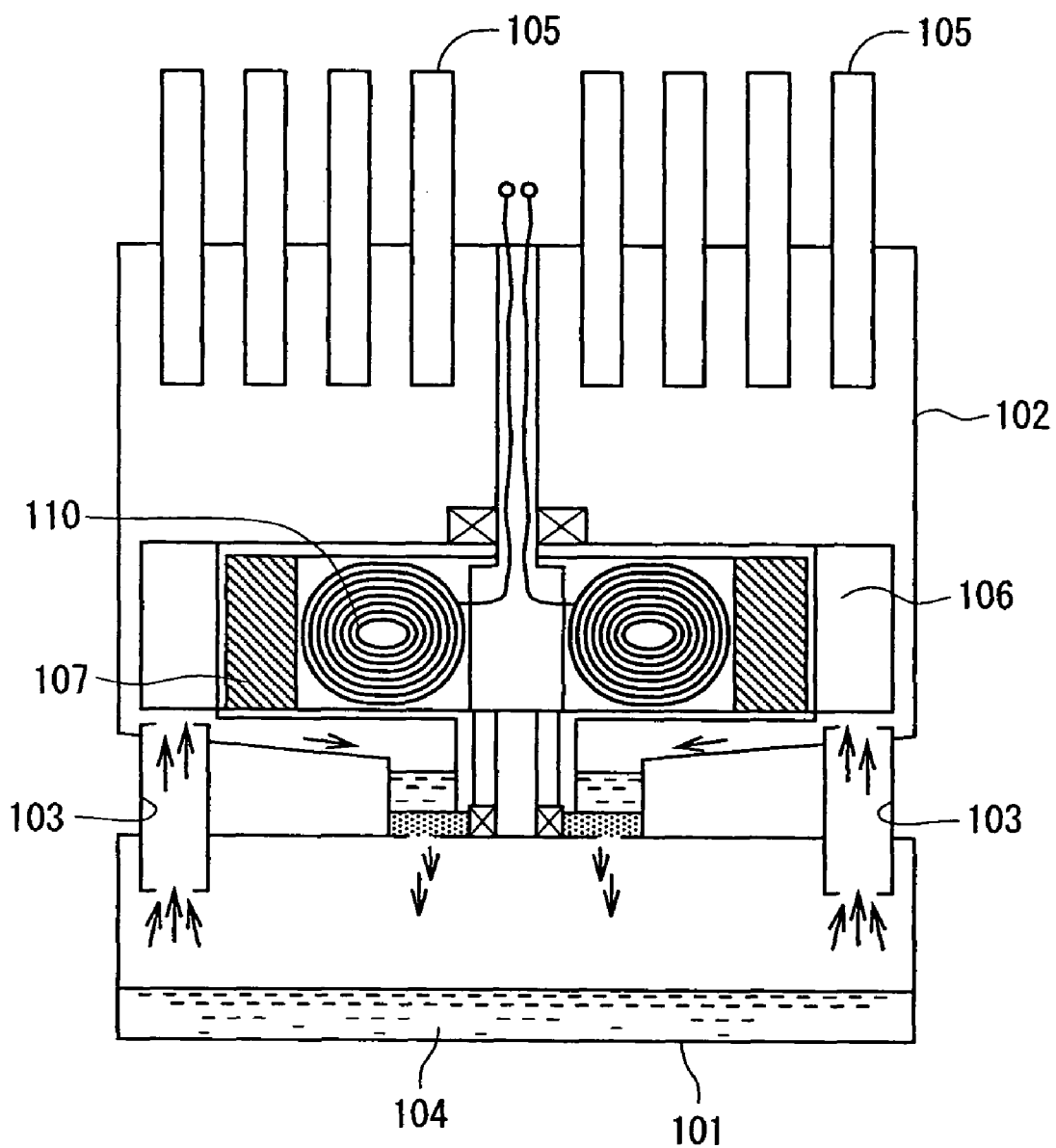
FIG. 3 is a view illustrating a conventional steam engine.

An embodiment of the present invention will now be described in detail with reference to the drawings. FIG. 1 is a sectional view of a steam engine of the present invention, wherein (a) shows a surface at right angles with the rotary shaft of a rotor, and (b) shows a surface including the rotary shaft of the rotor. FIG. 2 is a sectional view illustrating, on an enlarged scale, the rotor when it is in operation.

The steam engine of the present invention comprises a sealed container 2 holding a rotor 1 therein and containing water therein as an operation fluid, the water being nearly filled to capacity of the sealed container 2. Referring to FIG. 1(a), the sealed container 2 has a rectangular shape in cross section but may assume a circular shape in cross section so as to go along the outer circumference of the rotor 1. A condenser 3 is installed on the upper part of the sealed container 2 to condense the steam into the liquid. The sealed container 2 and the condenser are connected together through a short pipe for coupling and a joint. A steam-generating portion 4 to be heated by an external heat source is arranged under the sealed container 2.

The steam-generating portion 4 is constituted of a casing of nearly a cylindrical shape having a vaporization space therein, and has water flow-in passages 41 formed in the lower portion thereof and a steam flow-out passage 42 formed in the upper portion thereof. In this embodiment, the steam-generating portion 4 is contained in the sealed container 2. However, the steam-generating portion 4 may be separated from the sealed container 2 and may be coupled thereto by using a pipe. The condenser 3 is provided with a steam reservoir portion 31 of a circular shape in horizontal cross section. On the upper part of the steam reservoir portion 31, many pipes are circularly arranged and mounted being communicated with the steam reservoir portion 31 to cool and condense the steam by radiating the heat. The pipes 32 have their upper ends closed. Further, a vacuum pump 34 is connected, via a check valve 33, to the steam reservoir portion 31 of the condenser 3 to evacuate gases such as the air to thereby maintain a saturated steam pressure in the condenser 3 and in the sealed container 2.

The rotor 1 provided with many displacement chambers 11 is held in the sealed container 2 being dipped in water. The displacement chambers 11 are formed as hollows in the circumference of the rotor 1, and their ends on both sides are closed by side walls 12 while the outer sides thereof are opened in the sealed container 2. Blade-like partitioning walls 13 are formed among many displacement chambers 11, the partitioning walls 13 extending straight from the root portions thereof so as to be tilted rearward in the direction in which the rotor rotates relative to the direction of diameter of the rotor 1. Therefore, the rotor 1 assumes the shape of a water-wheel in cross section. Depending upon the cases, therefore, the partitioning walls 13 may be formed in a curved shape. The rotor 1 is rotatably supported at its both ends in the side wall of the sealed container 2 via bearings.

Referring to FIG. 1(b), a plurality of magnets 5 are buried and fixed near one end of the rotor 1, and rotate together with the rotor 1. A plurality of iron cores 7 and surrounding generating coils 6 are placed at positions facing the magnets 5, and are secured to the side wall of the sealed container 2 on the end side where the magnets 5 are placed. Though not shown, electric wires are connected to the generating coils 6 to take out the generated electric power, and the magnets 5 and the generating coils 6 are contained in a water-proof casing. In this embodiment, the rotational energy is output as the electric energy. It is also possible to attach a gear to the rotor 1 and rotatably support another gear in mesh therewith on the side wall of the sealed container 2 in order to take out the power in the form of the rotational energy.

Next, the operation of the steam engine of the present invention will be described.

In the steam-generating portion 4 arranged under the sealed container 2 which contains water, water is fed to the space through the flow-in passages. The lower side of the space forms a heating portion that is to be heated by a heat source such as the exhaust heat of an internal combustion engine and where water that is fed is heated to become steam of a high pressure. The steam of the high pressure is jetted in the tangential direction of the rotor 1 from the flow-out passage 42 provided on the upper portion of the steam-generating portion 4.

The jetted steam is fed, as indicated by arrows of a broken line in FIG. 2, into the displacement chambers 11 of the rotor 1 present just over the flow-out passage 42, and fills the displacement chambers 11 expelling water out of the displacement chambers. Therefore, buoyancy due to a difference of density between the steam and the water acts on the displacement chambers 11 on the left side of the center axis in FIG. 2 and, therefore, a rotational torque acts on the rotor 1 in clockwise direction causing the rotor 1 to rotate in the direction indicated by a white arrow. Further, the steam is jetted in the tangential direction of the rotor 1 and in a direction in which the rotor 1 rotates. Therefore, the steam imparts a torque of collision to the partitioning walls 13, and the water that is expelled is discharged rearward in the rotational direction as indicated by an arrow of a solid line in FIG. 2 imparting a torque of reaction to the rotor. By setting the steam flow-out passage 42 in the tangential direction as described above, the torque based on the buoyancy can be assisted.

The steam in the displacement chambers 11 is gradually released into the water in the sealed container 2 accompanying the rotation of the rotor 1. The displacement chamber 11 is filled with the water again as the partitioning wall 13 assumes the horizontal state. Here, if the partitioning wall 13 is formed in a curved shape which is convex upward, then the steam stays in the displacement chambers 11 for an extended period of time. The steam released into the water ascends as bubbles in the sealed container 2 and is sent to the steam reservoir 31 of the condenser 3 through the short pipe over the sealed container 2. The steam further enters into the cooling pipes 32 where it is cooled to turn into the condensate which moves downward due to gravity and is refluxed into the sealed container 2 through the short pipe. The step of vaporization and condensation resembles that of a heat pipe.

The vacuum pump 34 is connected to the condenser 3 to evacuate air and the like. Therefore, the inside pressure in the condenser 3 and in the sealed container 2 reduces, and is maintained at a saturated steam pressure. Accordingly, the boiling point of water in the sealed container 2 is lowered, and water is vaporized to become steam even in a state where the temperature in the heating portion is not so high, i.e., even in a state of low temperature, generating a rotational torque for rotating the rotor 1.

The rotational energy of the rotor 1 is taken out to an external unit as the electric energy due to the interactive electromagnetic action between a varying magnetic field generated in the iron cores 7 by the magnets 5 rotating together with the rotor 1 and the generating coils 6. According to this method of taking out the output, no sealing device needs to be arranged between the output take-out mechanism and the sealed container 2. Further, the rotor 1 of the present invention features a simple constitution having the displacement chambers 11 and the partitioning walls 13 only, without any moving member that undergoes a relative movement or a sealing device. Therefore, the engine can be easily constructed having a rigid structure and, therefore, featuring excellent durability.

INDUSTRIAL APPLICABILITY

As described above in detail, the steam engine of the present invention has the rotor having a plurality of displacement chambers provided in the sealed container which is filled with the liquid, and wherein the rotor is rotated by utilizing the buoyancy acting on the displacement chambers, and the heat added to the heating portion is converted into the rotational energy relying on a simple structure. Therefore, the steam engine of the present invention can be used as a heat engine for taking out the power from various kinds of heat sources. Though the above embodiment has dealt with the case of converting the heat in a low-temperature state such as the exhaust heat of an internal combustion engine into the rotational energy, it needs not be pointed out that the steam engine of the present invention is capable of taking out the power by using a heat source of a high temperature based, for example, on the combustion or the like. As the liquid that serves as the operation fluid, further, it will be obvious that a coolant such as ammonia, alcohol or Freon can be used not being limited to water only.

The invention claimed is:

1. A steam engine, comprising:
   a sealed container containing a liquid therein;
   a steam-generating portion arranged under the sealed container being communicated with the sealed container to generate steam of the liquid;
   a condenser arranged over the sealed container being communicated with the sealed container to condense the steam of the liquid;
   a rotor dipped in the liquid in the sealed container and being rotatably supported by the sealed container, the rotor comprising a plurality of displacement chambers and a plurality of partitioning walls;
   a flow-out passage provided on an upper portion of the steam-generating portion;
   a plurality of magnets fixed near one end of the rotor; and
   a plurality of iron cores and generating coils secured to a side wall of the sealed container, the iron cores and the generating coils being placed at positions facing the magnets,
   wherein the steam of the liquid generated in the steam-generating portion is fed to the rotor by jetting the steam from the flow-out passage, such that the steam of the liquid imparts a rotational torque to the rotor by collision to the partitioning walls, and by a buoyancy force of the steam of the liquid which fills the displacement chambers, a rotational energy of the rotor being output from the generating coils as an electrical energy.

2. The steam engine according to claim 1, wherein a vacuum pump is connected to the condenser, and
   wherein a pressure in the sealed container and in the condenser is set to be a saturated steam pressure of the liquid.

3. The steam engine according to claim 2, wherein a check valve is placed in a pipe which connects the vacuum pump to the condenser.

4. The steam engine according to claim 3, wherein an end of the pipe is inserted in a steam reservoir portion of the condenser and another end of the pipe is connected to the vacuum pump, a check valve being placed through the pipe between the steam reservoir portion of the condenser and the vacuum pump.

5. The steam engine according to claim 1, wherein the displacement chambers comprise a hollow portion in a circumference of the rotor.

6. The steam engine according to claim 1, wherein ends of the displacement chambers on both sides are closed by side walls of the rotor and outer sides of the displacement chambers are opened in the sealed container.

7. The steam engine according to claim 1, wherein the partitioning walls extend straight from a root portion of the rotor to be tilted rearward in a direction in which the rotor rotates relative to a direction of a diameter of the rotor.

8. The steam engine according to claim 1, wherein the steam of the liquid jetted from the steam-generating portion fills the displacement chambers to expel the liquid out of the displacement chambers.

* * * * *